United States Patent

[11] 3,600,512

[72] Inventor Bruce E. Crayton
     400 Plymouth Ave., Rochester, N.Y.
[21] Appl. No. 782,961
[22] Filed Dec. 11, 1968
[45] Patented Aug. 17, 1971
[73] Assignee Eastman Kodak Company
     Rochester, N.Y.

[54] APPARATUS FOR CORRELATING DIFFERENT PORTIONS OF A PROJECTED IMAGE AND METHOD OF ASSEMBLY THEREFOR
15 Claims, 7 Drawing Figs.

[52] U.S. Cl. .................................................. 178/7.85,
     33/80, 178/7.83
[51] Int. Cl. ........................................................ A43l 13/02,
     H01j 29/89
[50] Field of Search ............................................ 178/7.85,
     7.83; 33/80, 86, 103; 346/139 B, 140; 353/40

[56] References Cited
UNITED STATES PATENTS
2,244,549  6/1941  Blakeslee .................... 33/80
2,943,141  6/1960  Knight ......................... 178/7.85
3,374,546  3/1968  Justis ........................... 33/80

*Primary Examiner*—Bernard Konick
*Assistant Examiner*—Howard W. Britton
*Attorneys*—R. W. Hampton and R. Lewis Gable

ABSTRACT: This disclosure relates to apparatus for correlating different portions of an image displayed upon a screen and to a method of assembling the apparatus. Illustratively, the apparatus includes a correlating or indexing member which is suspended upon a flexible strand to allow the correlating member to be moved across the screen, and a plurality of guide points about which the strand is disposed. The guide points are located with respect to the display screen to permit the indexing member to be moved across a substantial portion of the display screen. The indexing member has an opening therethrough in which there is disposed spring means to interconnect a first portion of the flexible strand to a second portion of the flexible strand and also to place a predetermined tension upon the flexible strand.

PATENTED AUG 17 1971
3,600,512
SHEET 1 OF 2
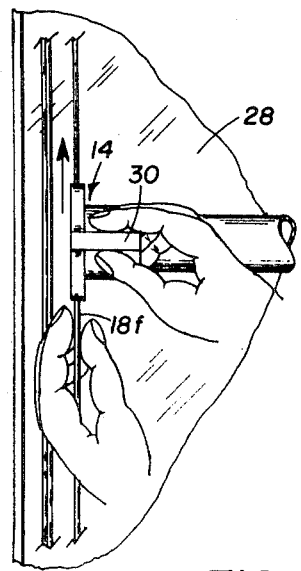
FIG. 5A
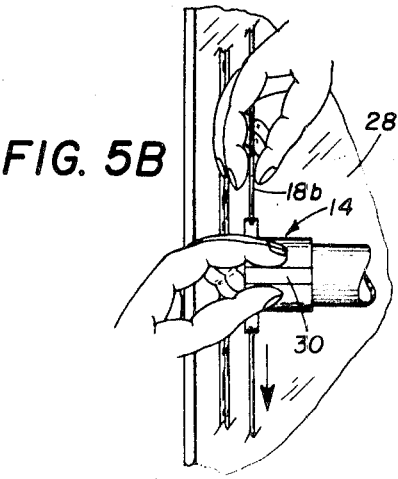
FIG. 5B
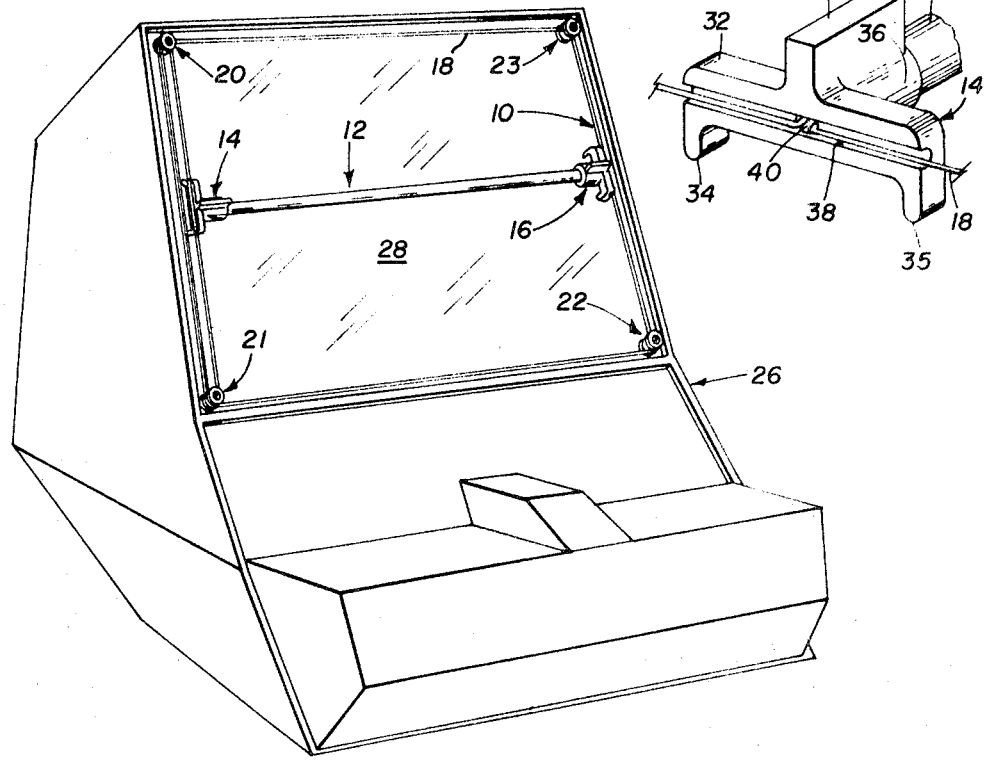
FIG. 1
FIG. 3
BRUCE E. CRAYTON
INVENTOR.
BY R. Lewis Gable
Robert W. Hampton
ATTORNEYS

BRUCE E. CRAYTON
INVENTOR.

ATTORNEYS

APPARATUS FOR CORRELATING DIFFERENT PORTIONS OF A PROJECTED IMAGE AND METHOD OF ASSEMBLY THEREFOR

BACKGROUND OF THE INVENTION

1. Field of the Invention

This invention relates to devices for displaying images and more particularly to apparatus for use in conjunction with such display devices for correlating or comparing different portions of the displayed image.

2. Description of the Prior Art

There are many types of devices which are capable of displaying images such as a television monitor incorporating a cathode-ray tube or a microfiche reader including a display screen. Often it is desired to display a single image upon the screen to allow an observer to analyze the displayed information. Depending upon the desired use of the information, it would be helpful to provide means for underscoring or readily identifying particular portions of the displayed image. For example, if the operator desires to record particular information from the displayed image, it would be helpful to underline those portions which are to be recorded so as to focus the attention of the operator upon this portion of the image. Further, it may be desirable to present an image containing a plurality of columns of information and to correlate data in one column with data in another column of the image.

Straight edges or crosshairs have been mounted upon projection display devices so as to be movable across the display screen. The mechanism for moving the straight edges or crosshairs have been designed for a particular display device and can not readily be adapted to other type of devices or to screens of varying size and format. These mechanisms have tended to be complex and expensive without the desired adaptability to other formats. Further, these mechanisms have not had the capability of easily adjusting the angular position of the straight edge to allow the operator to compare bits of information that are not disposed upon the same line or are disposed upon a line that is skewed with regard to the format of the displayed image.

Therefore, it is an object of this invention to provide a new and improved assembly for movably mounting an indexing or correlating member which may be adapted to many, different sizes and formats of display devices.

It is a further object of this invention to provide a new and improved assembly for mounting and indexing member which may be readily adjusted to correlate portions of the projected image which are skewed with respect to the format of the projected image.

SUMMARY OF THE INVENTION

In order to accomplish these and other objects of this invention, apparatus is provided for movably mounting an indexing or correlating member with regard to the display screen of a display device. More particularly, there are provided a plurality of guide points which are mounted with regard to the display device in order that the indexing member may be suspended for movement across the display screen upon a flexible strand disposed about the guide points. The indexing member may take the form of a tubular member having an opening therethrough with first and second supporting members suspending both ends thereof from the flexible strand. Means for interconnecting a first portion of this strand through the opening of the indexing member to a second portion of the strand includes a spring means for placing a tension upon the strand.

In an illustrative embodiment of this invention, there are provided four guide points taking the form of pulley assemblies about which the strand is suspended. The pulley assemblies may be located to define a quadrilateral figure. More specifically, a fist loop of the flexible strand is disposed about the first and second pulleys and a second loop of the strand is disposed about all four of the pulleys. The first support member is connected to the first loop and the second support member is suspended from a portion of a second loop, Illustratively, the support members may include handle portions to be manually grasped to move the indexing member across the display screen, and projecting feet to space the indexing member from the display screen thereby reducing the possibility of scratching the display screen.

An illustrative method of mounting the indexing member includes the steps of inserting a first loop of the flexible strand through the opening of the indexing member, attaching the spring to the first loop, and connecting a J-shaped member to the spring. The guide points or pulley assemblies are affixed with respect to the display screen to form a quadrilateral figure, and the flexible strand is disposed about the pulley assemblies. The ends of the flexible strand are tied together and the J-shaped member is withdrawn from the opening thereby stretching the spring. Finally, the spring is connected to a portion of the flexible strand to place a tension upon the strand determined by the length of the J-shaped member.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 shows a perspective view of a display device on which the apparatus for mounting an indexing member in accordance with the teachings of this invention may be disposed;

FIG. 3 is a detailed, perspective view of a support member for suspending an indexing member from a flexible strand;

FIGS. 5A and 5B show how the support members may be adjusted with respect to the strand in either direction.

DESCRIPTION OF THE PREFERRED EMBODIMENTS

Because certain parts of display devices and related apparatus are well known, the following description is directed in particular to those elements forming, or cooperating directly with the present invention; elements that are not specifically shown or described herein are understood to be selectable from those known in the art.

Figure 2:
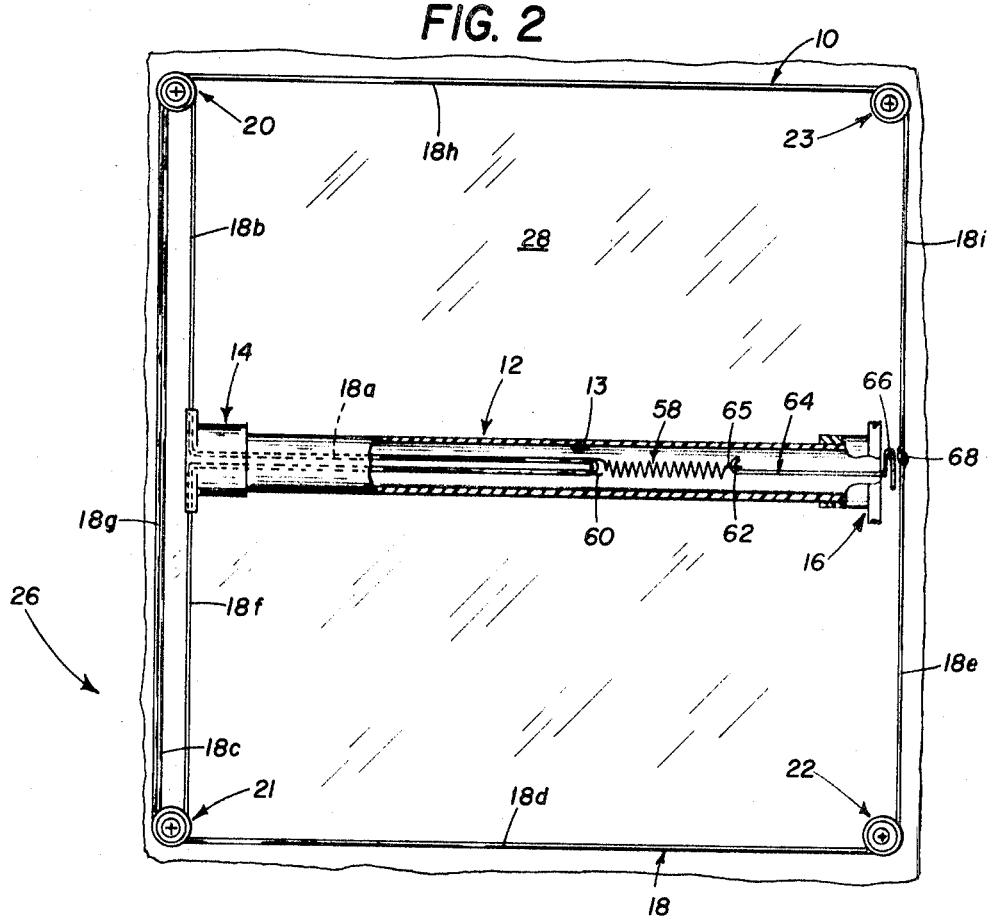
FIG. 2 is a plan view of the assembly for mounting an indexing member in accordance with teachings of this invention.

With regard to the drawings and in particular to FIG. 1, there is shown an image display device 26 including a display screen or surface 28 upon which is disposed a guide assembly 10 in accordance with the teachings of this invention. With regard to FIGS. 1 and 2, the guide assembly 10 includes an indexing or correlating member 12 which is suspended from a flexible strand or cord 18 to be movably mounted across the surface of the display screen 28. More particularly, the indexing member 12 includes first and second ends which are attached, respectively, to support members 14 and 16. The strand 18 is disposed about a plurality of guide points formed by pulley assemblies 20, 21, 22 and 23. The indexing member 12 as shown in FIG. 2, takes the form of a tubular member having an opening or passageway 13 therethrough. A first portion identified by the numeral 18a may be inserted within the opening 13 and connected to a spring 58. More particularly, the spring has a pair of hooks 60 and 62 which are respectively connected to the portion 18a and also, as will be explained later, to a second portion of the strand 18 by a J-shaped member 64. The J-shaped member 64 includes a hook 65 which engages the hook 62 of the spring 58. The J-shaped member 64 further includes a folded, enlarged portion 66 which is disposed substantially perpendicular to the member 64 and is to prevent the insertion thereof into the opening 13.

Figure 6:
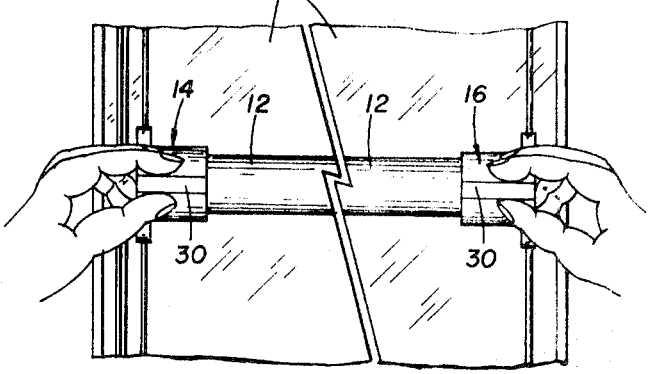
FIG. 6 shows how the support members may be manually manipulated to move the indexing member across the display screen.

With regard to FIG. 3, there is shown a detailed view of the support member 14 including a tubular portion 36 for receiving as shown in FIG. 2 the indexing member 12. Further, the support member 14 includes an upright portion 32 from which extend a pair of feet 34 and 35 to raise the support member 14 and the indexing member from the surface of the display screen 28 to thereby minimize the scratching of the surface of the display screen 28. A handle 30 extends upwardly from the tubular portion 36 to be manually grasped as shown in FIG. 6 for moving the indexing member 12 with respect to the display screen 28. The support members 14 and 16 serve to suspend the indexing member 12 from the strand 18. As shown in FIG. 3, the upright portion 32 includes a guide groove 38 which is aligned with the direction in which the handle 14 is moved along the strand 18. As shown in FIGS. 2 and 3, the first portion 18a of the strand 18 is inserted within the opening 13 through an opening 40 within the handle 14. Further, the guide groove 38 serves to stabilize the handle 14 upon the display screen 28.

Figure 4:
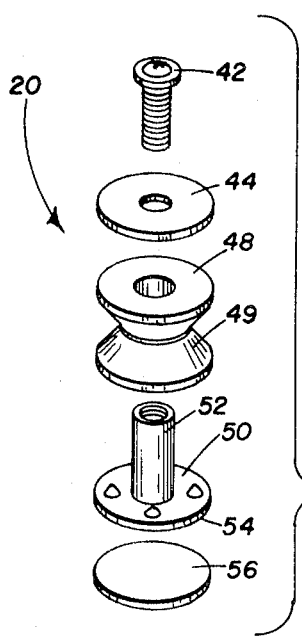
FIG. 4 shows an exploded view of a pulley which may be incorporated in the assembly of FIG. 2.

With regard to FIG. 4, there is shown an exploded view of the typical assembly 20 including pulley 48 which is rotatably mounted upon a post 52, which in turn is secured to a base 50. The pulley 48 is held upon the post 52 by a screw 42 which is inserted through a washer 44 to be threadably received within the post 52. As can be seen in FIGS. 2 and 4, the strand 18 is received within a recess of the pulley assemblies 20, 21, 22 and 23, and in particular, within a recess 49 of the pulley 48. A significant aspect of this invention is the adaptability of the guide assembly 10 to many different sizes and formats of display screens. In order to accomplish this object, each of the pulley assemblies and, as shown in FIG. 4, pulley assembly 20 is provided with a layer 54 of a suitable adhesive which serves to attach the pulley assemblies 20, 21, 22, and 23 to the image display device 26 or as shown in FIG. 1, directly to the display screen 28. In order to protect the layer 54 adhesive before its placement, a protective layer 56 is applied to the layer 54 of adhesive.

As shown in FIG. 2, the flexible strand 18 is disposed about the pulley assemblies 20, 21, 22 and 23 and the indexing member 12 is suspended from first and second portions of the strand 18. More particularly, a U-shaped or first portion 18a is disposed with the opening 13 and is the bight of portion 18a is connected to the hook 60 of the spring 58. Further, a first loop of the flexible strand 18 is formed by portions 18f, 18c and 18b about the pulley assemblies 20 and 21. A second loop of the strand 18 is formed about the pulley assemblies 20, 21, 22 and 23 and includes those portions identified by the numerals 18g, 18d, 18e, 18i, and 18h. The second loop is completed when portions 18e and 18i are tied together in a knot 68.

One of the significant aspects of this invention is the adaptability of the guide assembly 10 to a many different formats and sizes of display screens. The guide assembly 10 is sent to the user in the form of a kit, which is assembled by the user upon a cathode-ray tube or upon the display screen of a microform reader; the kit includes an extended length of the strand 18, a pair of support members 14 and 16, four pulley assemblies 20, 21, 22, and 23, a J-shaped member 64, a spring 58, and an extended length of the indexing e member 12. The first step in mounting the guide assembly 10 is the placement of the pulley assemblies 20, 21, 22, and 23 either upon the display device 26 itself or upon the display screen 28 to thereby define the operative area over which the indexing member 12 may be moved. The layer 56 is removed to thereby expose the layer 54 of adhesive material; as shown in FIG. 1, the pulleys 20, 21, 22, and 23 are inserted within the corners of the display screen 28 and are fixedly held thereto by the layer 54 of adhesive to thereby define a quadrilateral figure. Next, the indexing member 12 is cut to the desired length approximately equal to the distance between the opposite sides of the quadrilateral figure. Then, the first and second ends of the indexing member 12 are inserted within the tubular portions 36 of the support members 14 and 16. The U-shaped, first portion 18a is inserted through the opening 13 of the indexing member 12 and the bight of portion 18a is connected to the hook 60 of the spring 58. In turn, the hook 62 of the spring 58 is connected with the hook 65 of the J-shaped member and the free ends of the strand 18 are pulled until the enlarged end 66 engages the support member 16 and prevents the further insertion of the J-shaped member 64. The ends of the strand 18 extending from the opening 40 of the support member 14 are disposed about the pulley assemblies 20 and 21 to form the first loop and then disposed about the pulley assemblies 20, 21, 22, and 23 to form the second loop. The ends of the strand formed by portions 18i and 18e are tied to form the knot 68. Next, the J-shaped member 64 is withdrawn thereby expanding the spring 58 and placing the strand 18 under tension. When the J-shaped member 64 has been withdrawn, the hook 62 of the spring 58 is inserted within the knot 68 a to thereby complete the assembling process of the guide assembly 10. It is particularly noted that the length of the J-shaped member 64 is particularly chosen to stretch the spring 58 a desired amount thereby placing the desired tension upon the strand 18.

With regard to FIGS. 5A and 5B, there is shown how the angular orientation of the indexing member 12 may be adjusted with regard to the format of the displayed image. More particularly, as shown in FIG. 5A, a portion 18f may be grasped securely between the fingers while the handle 30 of the support member 14 is pushed upward. It is noted that the other support member 16 is fixedly secured with respect to the knot 68 so a that the end of indexing member 12 supported by member 14 will be raised with respect to the end of the indexing member 12 supported by the member 16. Conversely, as shown in FIG. 5B, the portion 18b may be grasped and the handle 30 may be moved downward to thereby readjust the position of the end of the indexing member 12 supported by the member 14 to a lower position. As the support member 14 is pushed upward or downward, a corresponding length of the portion 18a of the strand 18 slides freely over the hook 60 to thereby allow the desired adjustment. In this manner, the angular position of the indexing member 12 may be adjusted in a desired manner to thereby facilitate the correlation between different portions of the image projected upon the display screen 28.

After the guide assembly 10 has been mounted upon the display screen 28 and the angular position of the indexing member 12 has been adjusted with respect to the strand 18, the indexing member 12 may be moved upwardly and downwardly by grasping either of the handles 30 of the support members 14 and 16 as shown in FIG. 6. With regard to FIGS. 2 and 6, by manipulating support member 16 upwardly, portion 18i is moved upwardly, portion 18g is moved downward and portion 18f is moved upwardly so that both support members 16 and 14 are moved upwardly the same distance thereby maintaining the relative angular position of the indexing member 12. In a similar manner, as support member 14 is manipulated downward, portion 18f is likewise moved downward, portion 18c is moved upwardly, and portion 18i is moved downward to thereby displace support member 16 the same distance that support member 14 has been displaced.

Thus there has been shown a guide assembly for an indexing member which is readily adapted to be mounted on display screens of varying size and format. In addition, the indexing member may be readily adjusted to form any desired angle with respect to the format of the displayed image.

The invention has been described in detail with particular reference to preferred embodiments thereof, but it will be understood that variations and modifications can be effected within the spirit and scope of the invention.

I claim:

1. Apparatus for installation of a display surface, and for correlating various portions of an image projected onto the display surface, said apparatus including:

a member for correlating the different portions of the displayed image, said member for correlating having an opening between first and second ends, a flexible strand including at least first and second portions, means for suspending said strand with respect to the display surface including a plurality of guide points disposed so that said member for correlating may be movably disposed over the display surface, means disposed within said opening of said correlating member for interconnecting said first portion to said second portion, spring means for placing a predetermined tension upon said flexible strand and a removable tension determining member for determining the amount of tension to be placed upon said flexible strand by said spring means.

2. The invention as defined in claim 1, wherein said guide points comprise a rotatable pulley for e receiving said strand.

3. The invention as defined in claim 1, wherein said rotatable pulleys are rotatably mounted upon a base member, said base member having a pressure sensitive adhesive material for affixing said base member with respect to the display surface.

4. The invention as defined in claim 1, wherein there is further included first and second support members for mounting said correlating member from said flexible strand, said first and second support members including handle portions for manipulating said member for correlating across the display surface.

5. The invention as defined in claim 4, wherein said first and second support members each include foot portions for spacing said member for correlating from the display surface.

6. Apparatus for installation on a display screen upon which an image is displayed, comprising:

first, second, third, and fourth guide points;

an indexing member for correlating different portions of the displayed image, said member for correlating including first and second ends and a passageway extending from said first end to said second end, said first, second, third, and fourth guide points being located with respect to the display screen to facilitate the movement of said indexing member across the display screen;

a flexible cord including a first loop disposed about said first and second guide points and a second loop disposed about said first, second, third and fourth guide points, said first loop having a first portion, said second loop having a second portion;

first and second members for supporting said first and second ends of said indexing member from said first and second portions, respectively, of said first and second loops;

means disposed within said opening for interconnecting said first portion to said second portion and including spring means for placing a predetermined tension upon said flexible cord; and removable means for selectively determining the amount of tension to be placed upon said flexible cord by said spring means.

7. Apparatus for correlating various portions of an image projected upon a display surface, said apparatus including:

a member for correlating different portions of the displayed image, said member for correlating having first and second ends, and a passageway extending from said first end to said second end, a flexible strand including at least first and second portions, means for suspending said strand with respect to said display surface including a plurality of guide points disposed so that said member for correlating may be moved across the display surface, and means disposed within said passageway for interconnecting said first portion to said second portion including a spring connected to said first portion and a tension determining member having a first end to be releasably connected to a said spring and a second end having means for preventing the insertion thereof into said passageway, said tension determining member being withdrawn from said passageway to enable said spring to be attached to said second portion and to place a predetermined tension upon said flexible strand.

8. A method of mounting and assembling an indexing member having first and second ends and a passageway between the first and second ends of said indexing member, said indexing member supported respectively by first and second support members from a flexible strand having first and second ends, said flexible strand being disposed about a plurality of guide points, said method including the steps of:

locating said plurality of guide points to define the area over which said indexing member is to be moved, forming a first loop of said strand with a bight and inserting said first loop through said passageway;

connecting a spring member to said bight of said first loop;

attaching a tension determining member of predetermined length to said spring member, said tension determining member including means for engaging said second end of said indexing member;

disposing said strand about said guide points;

securing said first and second ends of said strand together; and withdrawing said tension determining member from said second end of said passageway and securing said spring member to said strand, said predetermined length being chosen to place the correct degree of tension upon said strand.

9. A method as claimed in claim 8, wherein said plurality of guide points includes first, second, third, and fourth guide points, and said step of disposing further including forming a second loop of said strand about said first and second guide points, and forming a third loop of said strand about said first, second, third and fourth guide points.

10. A method as claimed in claim 9, wherein said first and second ends of said strand are tied together in a knot between said third and fourth guide points and said spring member is secured to said knot.

11. Apparatus for installation of a display surface, and for correlating various portions of an image disposed upon the display surface, said apparatus being adjustable and including:

a member for correlating the different portions of the displayed image, said member for correlating including first and second ends, and a passageway extending from said first end to said second end, a flexible strand having at least first and second portions, means for suspending said flexible strand with respect to the display surface including at least first, second, third, and fourth guide points disposable to define a quadrilateral figure having at least first and second opposite sides and to facilitate the movement of said member for correlating across the display surface, and means for adjustably interconnecting through said passageway said first and second strand portions, spring means for placing a tension upon said flexible strand, and means for selectively determining the amount of tension to be placed upon said flexible strand by said spring means.

12. Apparatus as claimed in claim 11, wherein said member for correlating is disposable between said first and second opposite sides.

13. Apparatus as claimed in claim 12, wherein said spring means is disposable within said passageway and is interconnectable between said first and second strand portions; and said flexible strand includes a first loop disposable about said first and second guide points, and a second loop disposable about said first, second, third and fourth guide points.

14. A method of installing on a display surface an adjustable apparatus for correlating various portions of an image projected onto the display surface, said apparatus including an angularly adjustable indexing member having a passageway between first and second ends thereof, a flexible strand, first and second support members for supporting said indexing member, a plurality of guide points for receiving said flexible strand, and means for placing a predetermined tension on said flexible strand when received by said guide points and when supporting said indexing member, said method including the steps of:

locating a said guide points on the display surface to define the area of the display surface over which said indexing member is to be moved;

forming a portion of said strand into a first loop with a bight and inserting said first loop through the first end of said indexing member and through the passageway therein;

connecting a spring member to the bight of said first loop;

attaching a tension determining member of predetermined length to said spring member, said tension determining member including means for engaging the second end of said indexing member;

disposing said strand about said guide points in second and third loops;

tying the ends of said strand together in a knot; and withdrawing said tension determining member from the second end of said indexing member and securing a said spring member to the strand knot, the predetermined length of said tension determining member being chosen to place the desired degree of tension upon said strand.

15. The method defined in claim 14 wherein said plurality of guide points includes first, second, third and fourth guide points, and said step of disposing said strand about said guide points further including forming said second loop of said strand about said first and second guide points, and forming said third loop of said strand about said first, second, third and fourth guide points.